UNITED STATES PATENT OFFICE.

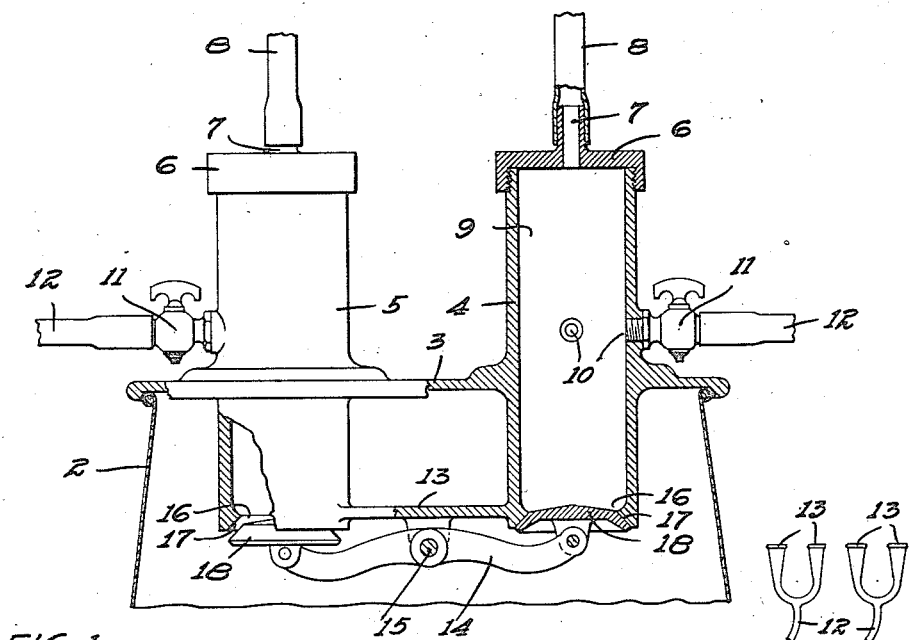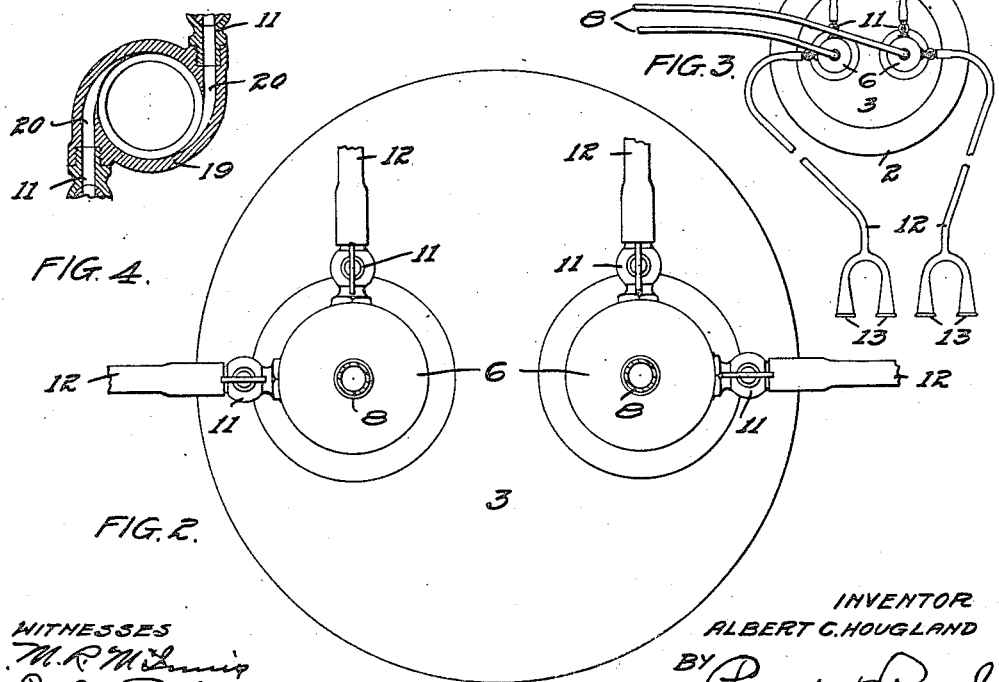

ALBERT C. HOUGLAND, OF MADISON, WISCONSIN.

MILKING-MACHINE.

1,245,106.      Specification of Letters Patent.      Patented Oct. 30, 1917.

Application filed October 19, 1915. Serial No. 56,653.

*To all whom it may concern:*

Be it known that I, ALBERT C. HOUGLAND, citizen of the United States, resident of Madison, county of Dane, State of Wisconsin, have invented certain new and useful Improvements in Milking-Machines, of which the following is a specification.

The object of my invention is to provide a milking machine of such construction that hand stripping of the cow after milking will be unnecessary.

A further object is to provide a machine of extremely simple construction with all parts accessible for the purpose of examination or cleansing.

A further object is to provide a milking machine having a large capacity and easily movable from place to place.

The invention consists generally in various constructions and combinations, all as hereinafter described and particularly pointed out in the claims.

In the accompanying drawings forming part of this specification,

Figure 1 is a view, partially in section, of a milking machine embodying my invention, the vacuum pumps being omitted, as they form no part of the present invention, Fig. 2 is a plan view of the same, Fig. 3 is a diagrammatic view of the same, Fig. 4 is a sectional view showing a modified means for directing the milk into the receivers, which will cause it to follow the walls of the receivers.

In the drawing, 2 represents a suitable milk receptacle, having the usual open top. 3 is a plate or base, fitting over the open top of the receptacle and closing the same, being supported on the receptacle walls. In this plate milk receivers are mounted. As shown in the drawing, these receivers indicated by reference numerals 4 and 5, are of duplicate construction, and preferably cylindrical in form, cast with the plate and projecting above and below it.

At the upper end each receiver has a cap 6 having threaded engagement with the walls of the receiver and provided with a nipple 7 to which is connected a tube 8 leading to the vacuum pump, not shown. I prefer to provide two pumps in this machine, one for each receiver, each being a single-acting oscillating pump, mounted to operate alternately so that a vacuum will be formed first in one receiver and then in the other.

Each of the milk receivers has a chamber 9 therein, provided with two milk inlets 10 located at any suitable point in its side walls above the plate 3. In each of these milk inlets I prefer to insert a valve 11 for closing or opening the inlet, and tubes 12 lead from these valves to teat-cups 13, two of which are preferably connected with each tube, as shown. When the pumps are operated, a vacuum will be formed in the chambers 9 alternately and by means of the valves 11 the vacuum may be shut off from any two of the teat-cups, or all of them, if desired. Each milk tube, as stated above, has two cups connected therewith and these cups are preferably connected with the teats of two cows instead of four of them being connected with one cow. For example, the cups of the milk tube of one receiver may be connected to the forward teats of a cow and the other two cups of the same receiver connected to the corresponding teats of another cow, and the cups of the other receiver connected in a similar manner to the rear teats of the two cows. In this way, when the vacuum is formed in the chamber 9, and in the milk tubes connected therewith, the milk will flow from the two teats of one cow and from two teats of another cow to this chamber. An alternating movement is thus provided with each pulsation of the two pumps.

Between the lower ends of the milk receivers I prefer to provide a web 13 on which an arm 14 is centrally pivoted at 15 to rock in a vertical plane. The lower ends of the milk receivers have ports 16 therein provided with seats 17 for valve disks 18 which are pivoted on the ends of the arm 14 and alternately rise and fall with the rocking of this arm to open or close the ports 16.

In the operation of this machine, the suction stroke of one of the pumps will create a partial vacuum in one of the milk chambers 9 and the milk tubes and cups connected therewith, and the milk flowing into this milk chamber will settle to the bottom by gravity and when the vacuum is destroyed, will open the valve in the bottom of that milk chamber and close the valve in the other chamber. The operation of the other pump will reverse this movement. On the back stroke of the pump, the air admitted will be forced through the air ducts into the milk chamber to open one valve positively and close the other, and to still further insure movement of the valves, each pump on its suction stroke draws one valve to its closed position and opens the other one. This alternate movement of the balanced valves I have found to be remarkably efficient in a device of this kind. The valves operate quickly and positively, allowing the milk to be discharged instantly from the milk chambers, and I have found that a machine made in this way will so thoroughly milk the cow that hand stripping afterward is unnecessary.

In Fig. 4 I have illustrated a form of milk receiver 19 having intake ports 20 therein which are arranged tangentially in the walls of the receiver for the purpose of directing the milk against the walls on the inside instead of across the milk chamber, as in the construction shown in the previous figures. In other respects, the apparatus is substantially the same as above described. The purpose of directing the milk around the walls of the receiver is to cause it to be influenced to a less degree by the action of the pump.

I do not wish to be confined to the shape of the milk receivers or the manner of mounting them on the milk pail, as in various ways these details of construction may be modified and still be within the scope of my invention.

I claim as my invention:

1. A milking machine comprising milk receivers having means for mounting them on a milk receptacle and having vacuum pump tubes and milk tubes communicating with said receivers and also having milk discharge ports in their lower ends, a rocking arm centrally pivoted between the lower ends of said milk receivers, and valves pivotally supported on said arm and engaging alternately seats provided in the lower ends of said milk receivers for closing and opening the same.

2. A milking machine comprising a cover adapted to be fitted on the open top of a milk receptacle, milk receivers formed on said cover and projecting above and below the same, vacuum tubes connected with the upper portions of said milk receivers, the lower ends of said receivers within said receptacle being open and having valve seats formed therein, and an arm centrally pivoted between the lower ends of said receivers and valve disks carried by said arm for alternately closing the open lower ends of said receivers.

In witness whereof, I have hereunto set my hand this 16" day of October 1915.

ALBERT C. HOUGLAND.